Nov. 20, 1923.  1,475,073
C. H. McCLURE
HARVESTER
Filed Sept. 2, 1921   5 Sheets-Sheet 1
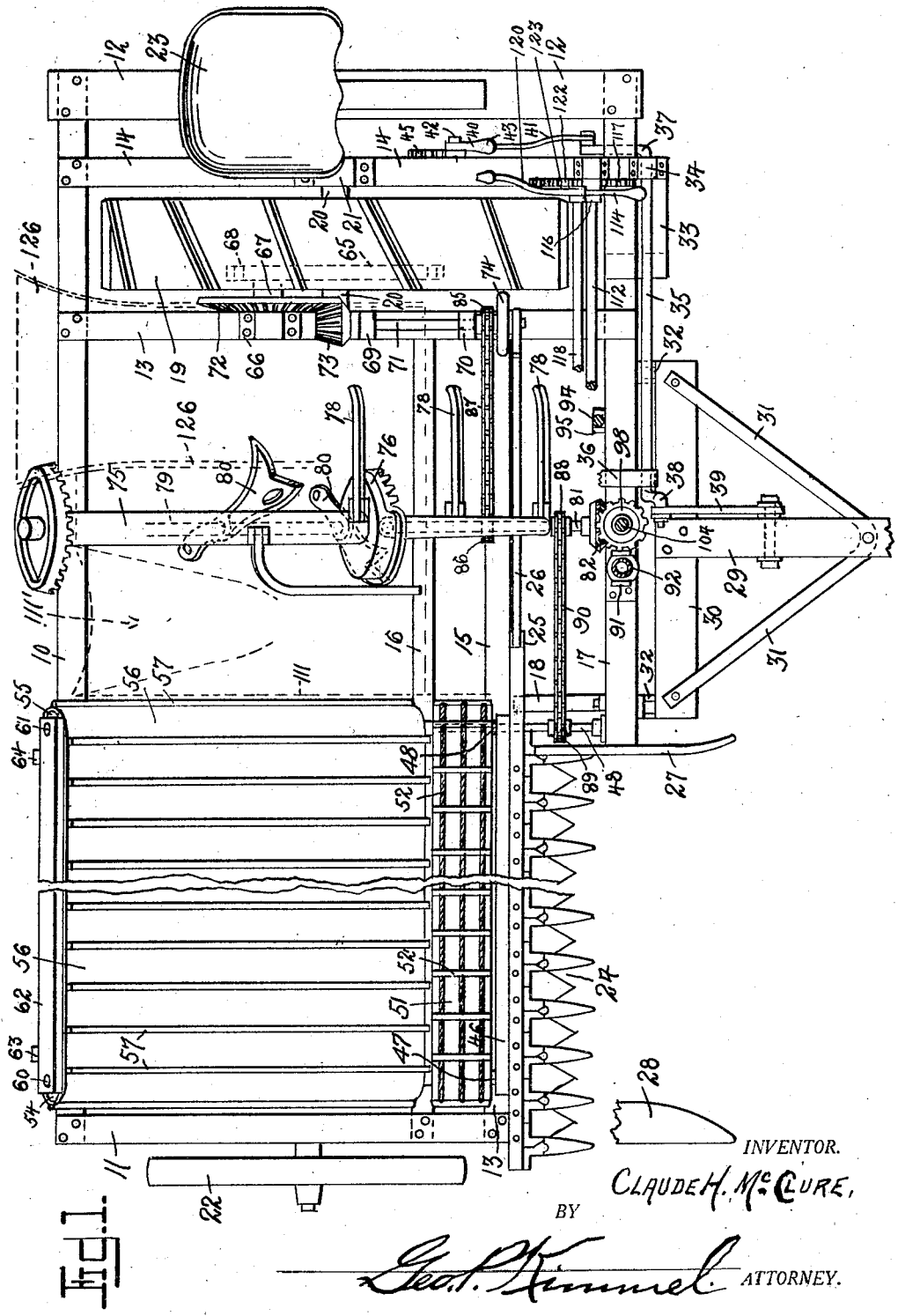
INVENTOR.
Claude H. McClure,
BY
Geo. P. Kimmel ATTORNEY.

Nov. 20, 1923. 1,475,073
C. H. McCLURE
HARVESTER
Filed Sept. 2, 1921  5 Sheets-Sheet 2
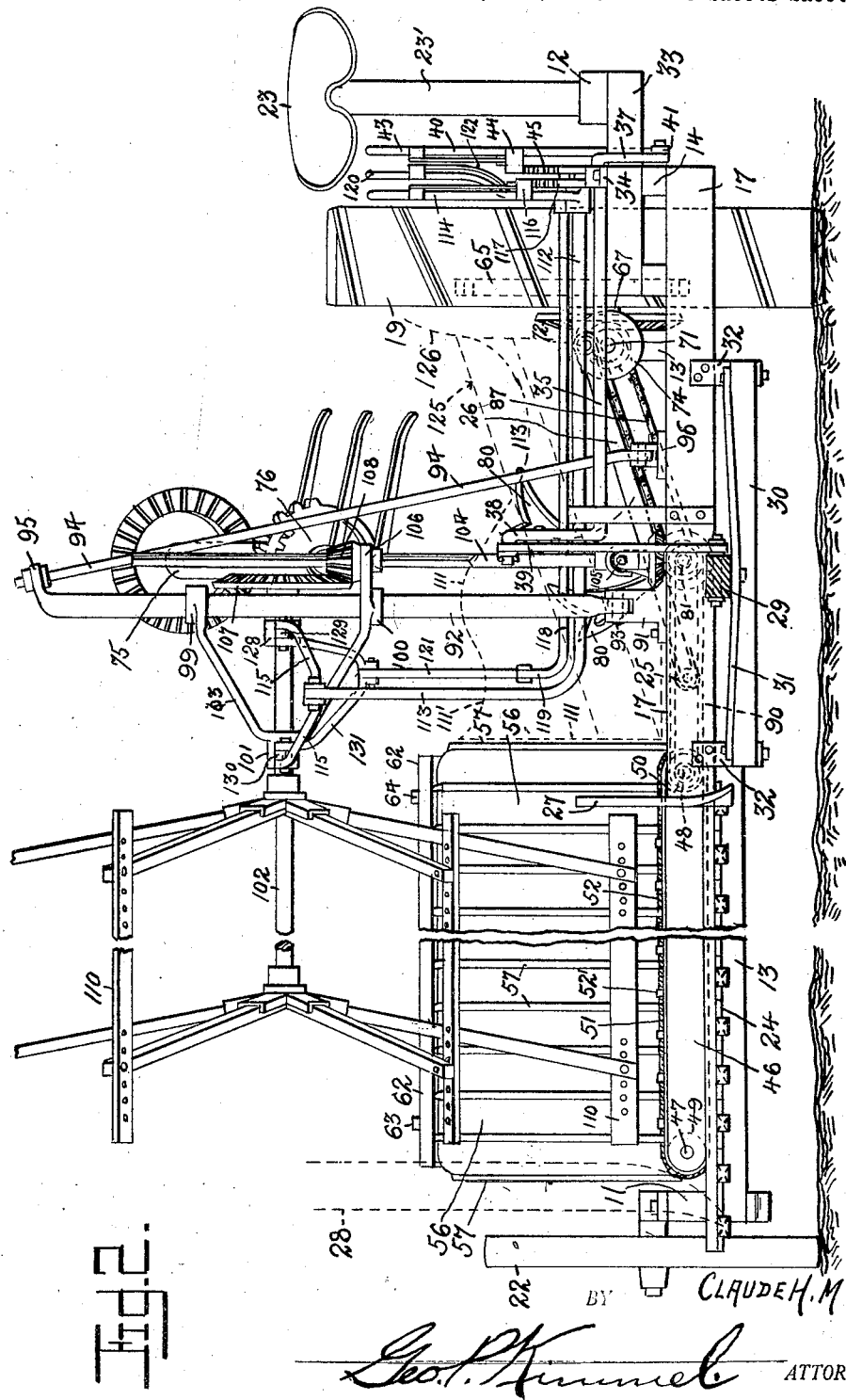

Nov. 20, 1923. 1,475,073
C. H. McCLURE
HARVESTER
Filed Sept. 2, 1921 5 Sheets-Sheet 3
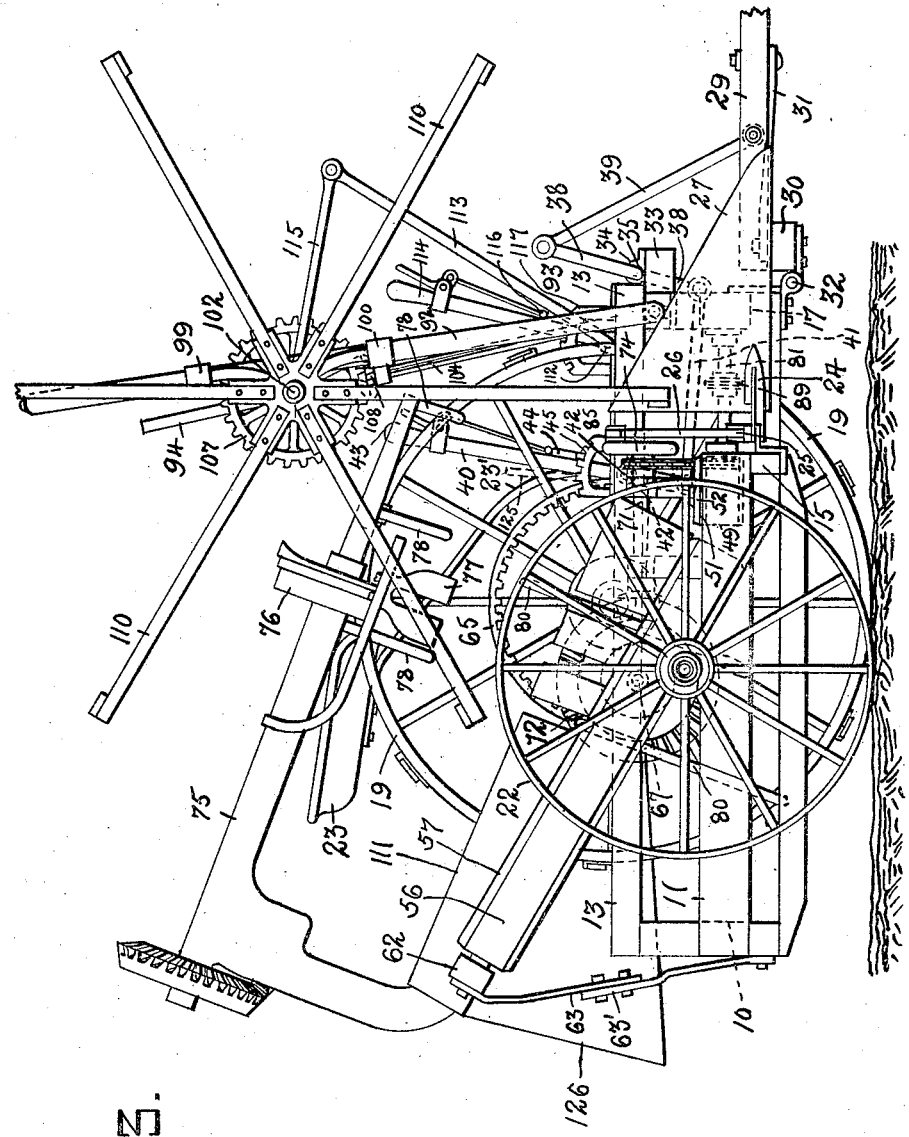
CLAUDE H. M<sup>c</sup> CLURE INVENTOR.
BY
Geo. P. Kimmel ATTORNEY.

Nov. 20, 1923.  1,475,073
C. H. McCLURE
HARVESTER
Filed Sept. 2, 1921  5 Sheets-Sheet 4
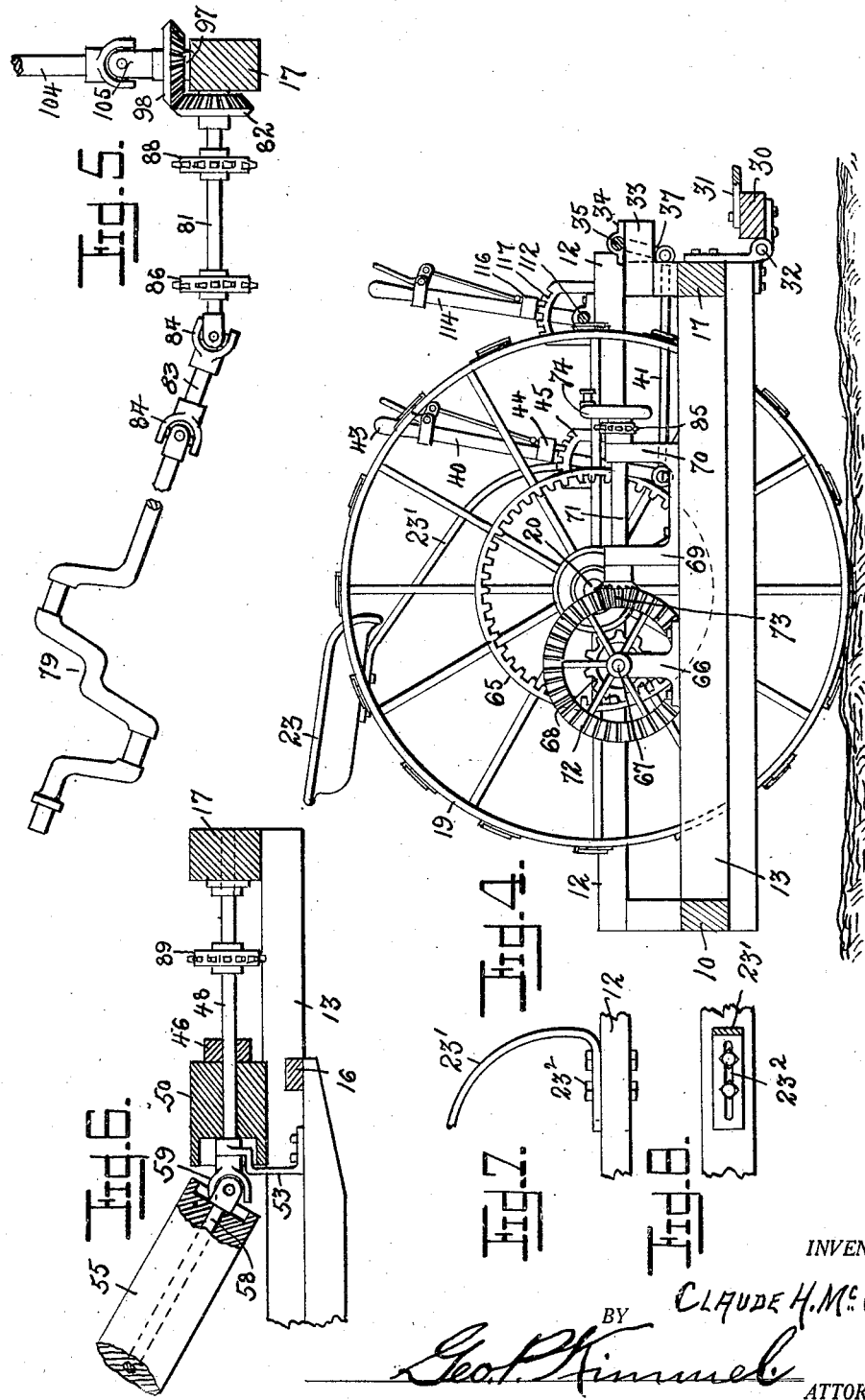
INVENTOR.
CLAUDE H. McCLURE
BY
Geo. P. Kimmel
ATTORNEY

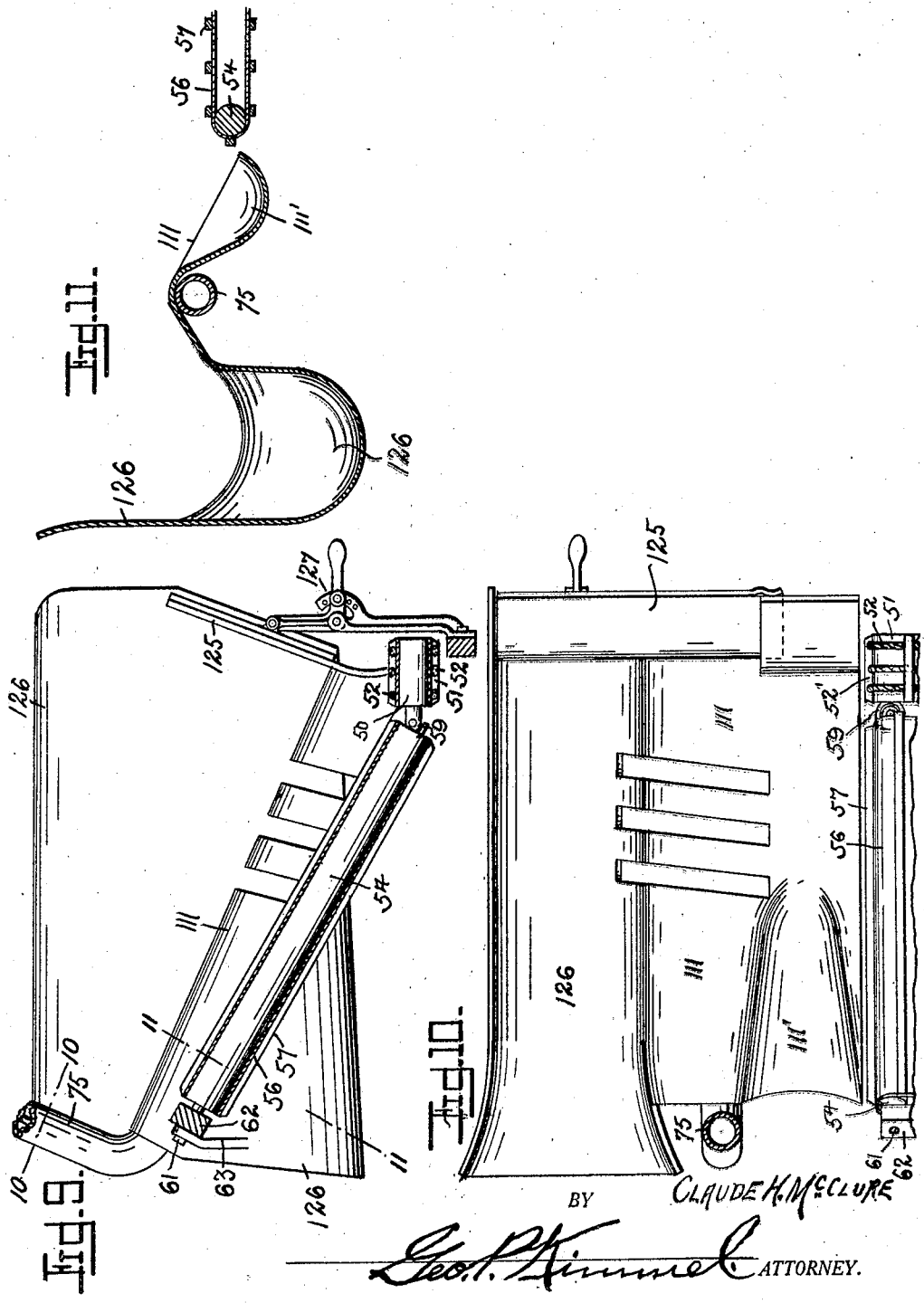

Patented Nov. 20, 1923.

1,475,073

UNITED STATES PATENT OFFICE.

CLAUDE H. McCLURE, OF OAKTOWN, INDIANA.

HARVESTER.

Application filed September 2, 1921. Serial No. 497,961.

*To all whom it may concern:*

Be it known that I, CLAUDE H. MCCLURE, a citizen of the United States, residing at Oaktown, in the county of Knox and State of Indiana, have invented certain new and useful Improvements in Harvesters, of which the following is a specification.

This invention relates to grain harvesting machines, and has for one of its objects to improve the construction and increase the efficiency and utility of devices of this character.

Another object of this invention is to produce a device of this character including a binder mechanism with its knotter arm inclined downwardly and forwardly, a relatively narrow horizontal apron or carrier operating relatively close to the sickle devices to receive the grain when first severed thereby, a wider upwardly and rearwardly inclined slatted carrier to receive the severed grain from the narrow carrier and convey it toward the binder mechanism, an inclined deck in position to receive the severed grain from the inclined carrier and having a depression in its rear upper face to receive the head portions of the severed grain, a stationary butter device at the lower forward end of the deck member, and a rearwardly inclined and rearwardly opening chute to receive the bound bundles from the binder mechanism, and discharge them toward the rear.

Another object of this invention is to produce a device of this character wherein the driving force for the sickle members, the coacting carrier devices, the packer members of the binder, and the reel device, is materially simplified without detriment to the efficiency of the apparatus.

Another object of the invention is to produce a device of this character having improved means for coupling the draft tongue to the frame of the harvester.

A still further object of the invention is the provision of a machine of this character, wherein the levers for the control of the frame, reel and other adjustable parts are disposed forwardly of said machine and in convenient reach of the operator of the machine.

With these and other objects in view, the invention consists in certain novel features of construction as hereinafter shown and described and then specifically pointed out in the claims, and in the drawings illustrative of the preferred embodiment of the invention;—

Figure 1 is a plan view of the improved apparatus with unimportant parts omitted.

Fig. 2 is a front elevation.

Fig. 3 is an end elevation from the grain end.

Fig. 4 is a detail looking toward the tractor wheel illustrating the construction of a portion of the driving mechanism.

Fig. 5 is a detail illustrating the construction of the packer shaft and a portion of the transmission gearing between the tractor wheel, the sickle and carrier devices.

Fig. 6 is an enlarged sectional detail of the coupling between one of the shorter horizontal carrier rollers and one of the longer inclined carrier rollers.

Figs. 7 and 8 are details illustrating the adjustment of the seat standard, the standard being in transverse section.

Fig. 9 is a detail illustrating the construction and operation of the deck and butter devices.

Fig. 10 is a plan view of the parts shown in Fig. 9 with the knotter arm in section on the line 10—10 of Fig. 9.

Fig. 11 is a section on the line 11—11 of Fig. 9.

The improved apparatus comprises an oblong base frame formed with a continuous rear member 10, continuous grain end member 11, continuous stubble end member 12, spaced intermediate frame members 13 and 14, a forward frame member 15 extending between the frame members 11 and 13, and a longitudinally intermediate frame member 16 likewise extending between the frame members 11 and 13 and spaced from the frame member 15. The frame members 12, 13 and 14 are extended forwardly, and connected to the extended portions is a shorter forward frame member 17. The frame member 17 is connected at its inner end to the frame member 15 by a stay or brace 18, as shown in Fig. 1.

The tractor wheel is represented at 19 and is mounted on an axle 20, the latter in turn being supported by suitable bearings 21 upon the intermediate frame members 13 and 14, while the grain wheel is represented at 22 and supported from the frame member 11.

The driver's seat 23 is mounted on the frame member 12 as shown, by a curved standard 23'.

The sickle portion of the apparatus is represented as a whole at 24 and is of the usual construction and includes a pitman connection 25 and pitman 26.

The grain side divider is represented at 27 and the stubble side divider indicated at 28.

The draft tongue, a portion of which is represented at 29, is provided with a rear T member 30 rigidly connected to the tongue and supported by diagonal braces 31.

The cross member 30 is hingedly united to the frame member 17 as shown at 32 and is therefore free to be elevated and depressed. A short extension 33 of the frame member 17 is provided with a bearing 34 to support a rock shaft 35 at one end, while the opposite end of the rock shaft is supported by a standard 36 attached to the frame member 17. At its opposite ends the shaft 35 is provided with oppositely directed crank arms 37 and 38. The crank arm 38 is connected to the tongue 29 by a rod 39, while the crank arm 37 is connected to the lower end of an operating lever 40 by a rod 41. The member 40 is pivoted at 42 to the frame 14 and terminates in a hand grip 43 convenient to the driver on the seat 23. The lever 40 is provided with a pawl device 44 coacting with a toothed segment 45 on the frame member 14 to hold the lever in adjusted position. By this simple arrangement, the tongue 29 can be elevated and depressed to any desired extent and locked in adjusted position by the driver without leaving his seat.

The front or forward frame member 15 is utilized to support the holders for the sickle bar. Supported on the frame member 15 is a coupling member 46, and mounted for rotation in the member 46 near the ends are stub shafts 47 and 48, and mounted on the stub shafts and rotative therewith are relatively short rollers indicated at 49 and 50 over which a flexible belt 51 of canvas or the like operates. The belt 51 is provided with a plurality of flexible elements such as ropes or cords 52, and may also be provided with transverse slats 52', if required.

The belt 51 and its cords 52 and slats 52', if the latter are employed, constitute a narrow carrier belt located in the rear of the sickle mechanism, as shown more clearly in Fig. 1. At their inner or rear ends the stub shafts 47 and 48 are supported by suitable brackets one of which is represented at 53, in Fig. 6.

Extending rearwardly of the short rollers 48 and 50 are longer rollers 54 and 55, the longer rollers being supported normally at an angle of about 30 degrees to the longitudinal axes of the shorter rollers.

An endless belt of canvas or the like represented at 56 is disposed around the inclined rollers 54 and 55 and provided with carrier slats 57 which constitute a relatively wide slatted and inclined carrier or apron coacting with the narrower horizontal carrier to convey the cut grain to the binder mechanism.

Secured in the lower forward ends of the longer rollers are stub shafts, one of which is represented at 58, in Fig. 6, the stub shaft 48 being coupled to the stub shaft 58 by a universal joint represented at 59.

At their higher outer ends, the longer rollers 54 and 55 are provided with studs 60 and 61 mounted for rotation in a supporting bar 62, the latter being supported from the rear frame member 10 by standards 63 and 64, to maintain the rollers in position.

Attached to the axle 20, preferably within the lines of the tractor wheel 19, is an internal gear 65, and supported by a bracket 66 rising from the frame member 13 is a stub shaft 67 carrying a pinion 68 in constant engagement with the internal gear 65.

Rising from the frame member 13 are other standards 69 and 70 which support a shaft 71 the latter extending in parallel relation to and spaced above the frame member 13. Mounted on the stub shaft 67 is a bevel gear 72, and mounted on the shaft 71 is a bevel pinion 73 in constant engagement with the bevel gear 72.

By this means it will be obvious that the motion of the tractor wheel 19 will be transmitted to the shaft 71 at greatly increased speed.

Mounted on the forward end of the shaft 71 is a crank wheel 74 to which the pitman 26 is coupled, whereby the motion of the shaft 71 is communicated to the sickle knife.

A sufficient portion of the binder mechanism is shown to illustrate the invention, including the knotter arm 75, the knotter head at 76, the breast plate at 77, the discharge arms at 78, the packer shaft at 79, and the packers at 80. The needle arm is not shown, as it forms no part of the present invention.

Supported in any suitable manner from the framework of the apparatus is a counter-shaft 81 carrying a bevel gear or pinion 82 at its forward end. Extending between the rear end of the counter shaft 81 and the forward end of the packer shaft 79, is a connecting shaft 83, necessarily arranged obliquely relatively to the axis of the shafts 79 and 81, and coupled thereto by universal joints 84 of suitable construction. Mounted respectively on the shafts 71 and 81 are chain wheels 85 and 86 to receive an endless chain 87.

By this means the motion of the shaft 71 is communicated to the shaft 81 and thence to the packer shaft.

Mounted respectively upon the counter shaft 81 and the shaft 48 of the narrower carrier belt, are chain wheels 88 and 89 to receive an endless chain 90 whereby the motion of the shaft 81 is communicated to the shaft 48 and thence to both the slatted conveyor belts, as will be obvious. By this simple arrangement of the parts, all of the various movements of the mechanism are produced from the single tractor wheel 19.

Attached to the frame member 17 is a bearing 91 to which the lower end of the reel standard 92 is mounted to swing by a pivot 93. At its upper end the reel standard is supported by a brace 94, coupled at 95 to the upper end of the standard and swingingly coupled at 96 at its lower end to the frame work.

Attached to the forward frame member 17 is another bearing in which a stub shaft 97 is supported, the stub shaft carrying a bevel gear 98 in constant engagement with the bevel gear 82 on the shaft 81.

Slidably supported on the standard 92 is a bracket device comprising spaced collars 99 and 100 movably engaging the standard, a sleeve 101 in which the reel shaft 102 rotates, and diagonal braces 103 between the sleeve 101 and the collars 99 and 100.

Extending upwardly from the stub shaft 97 is the reel driving shaft 104, being coupled to the stub shaft by a flexible joint 105, so that the shaft may be adjusted to operate at various angles without cramping the parts.

The collar 100 is formed with an extension 106 to provide a guide to the reel driving shaft 104, as shown.

Mounted to rotate with the reel shaft 104 is a bevel gear 107 operating in constant engagement with a bevel pinion 108 on the shaft 104.

The shaft 104 is preferably square for a portion of its length, and the hub of the pinion 108 is correspondingly square to slidably engage the shaft, so that when the reel standard is caused to swing on its pivot 93, the shaft 104 will swing with it and the gears 107 and 108 constantly retain their cooperative positions.

The reel is represented as a whole at 110 and is of the usual construction and operates in the usual manner to lay the cut grain upon the carrier devices.

The binder deck is indicated at 111 in full lines in Figs. 3, 9, 10 and 11 and in dotted lines in Figs. 1 and 2. The binder deck is inclined as shown, preferably at a less degree than the inclined carrier, and is formed with a depression or pocket 111' at the rear and higher side, to receive the head portions of the grain as it passes to the binder.

At its lower forward edge the deck 111 extends nearly to the forward edge of the narrow carrier, and located at this point and extending toward the tractor wheel is a substantially stationary butter device, indicated as a whole at 125, and substantially at right angles to the general face of the deck.

A receiving trough or chute, shown in Figs. 3, 9, 10 and 11 at 126 and indicated by dotted lines in Figs. 1 and 2, is located in position to receive the bound bundles from the binder, and is open at the rear and closed at the forward end by the butter member. The butter member 125 extends at one end to the side of the chute 126 where the latter rises to form a guard to the shaft 71 and its associated parts, and is preferably slightly adjustable at the end next to the side of the chute, as by a lever device illustrated at 127.

The supports 63 are preferably adjustable longitudinally, as indicated at 63', to enable the inclination of the carrier 56 to be adjusted, as required, and the butter member will be adjusted to conform thereto.

Mounted for oscillation relative to the frame members is a rock shaft 112 having a relatively long crank arm 113 at one end, and an operating lever 114 at the other end. The crank arm portion 113 is coupled to the reel shaft 102 by a yoke device 115. The operating lever 114 is provided with a pawl device 116 coacting with a toothed segment 117 attached to the frame member 14.

Mounted for oscillation relative to the frame members is a third rock shaft 118 having a relatively short crank arm 119 at the inner end and an operating lever 120 at the other end. Mounted loosely on the reel shaft 102 next to the hub of the gear 107 is a collar 128, and extending from the latter is a perforated ear 129 while a similar perforated ear 130 extends from the collar or sleeve 101. The forked arms 115 are pivoted at their free ends to the ears 129 and 130 at one side, while similar forked members 131 are pivoted at their upper ends to the ears at their opposite sides and connected at their lower ends to the rod 121. By this means an upward pressure is applied to the reel shaft and strongly supplements and reinforces the reel supporting bracket. The operating lever 120 is provided with a pawl device 122 coacting with a toothed segment 123 attached to the frame members.

By this means the reel shaft may be adjusted vertically by causing the bracket device to be moved upon the standard 92, and held in adjusted position as will be obvious.

Inclining of the apron throws the heavier "beaded" ends of the gavel forwardly and nearer the center line of the axle of the tractor wheel thus bringing the center of gravity substantially in alinement with the axle, and balancing the whole apparatus on the axle, and rendering it unnecessary to employ a tongue truck.

By this means the reel may be adjusted both vertically and forwardly and backwardly to adapt it to the length and condition of the grain.

It will be noted that all the operating levers 40, 114 and 120 are forward of the driver's seat, and accessible therefrom so that the driver can produce all of the necessary adjustments without leaving his seat.

The apparatus is so evenly balanced that a tongue truck is not required, which is of great advantage.

As the cut grain falls over the shorter and horizontal carrier, the flexible members 52 hold the butt ends of the straw in position and prevent them from slipping back again over the sickle knives, while being moved toward the binder mechanism, and after the cut grain passes to the deck portion, the larger head ends drop into the pocket portion 111′, while the butt ends are caused to settle toward and in contact with the butter member.

The movement of the cut grain over the inclined carrier and over the inclined deck naturally causes the individual straws to be carried by gravity toward the lower portion of the deck and against the butter member, the latter checking the downward movement and automatically adjusting the butts and arranging them uniformly.

The "butting" is thus produced by a stationary butting member in coaction with the inclined moving carrier and inclined deck and is an important and valuable feature of the improved device.

The seat standard 23′ is adjustably mounted on the frame member 12, as shown at 23² in Figs. 7 and 8, so that the weight of the driver on the seat, may be maintained at the center of gravity of the machine.

The frame is light and strong and many parts employed ordinarily on harvesters and binders of the usual construction are eliminated in the improved construction.

One important feature of the improved construction is the location of all of the operating levers at the front and convenient to the operator on the seat, who can thus produce all of adjustments without leaving his seat, and materially increasing the convenience of the operation. The levers are conveniently located for tractor use, and require no extra hitch when applied to a tractor.

It will be noted that the knotter arm and the binder or knotter head are reversed in position from the usual binder mechanism, thereby eliminating many of the complicated and heavy parts, and correspondingly reducing the weight and expense.

The improved apparatus is very simple and is in fact an elevatorless binder.

The connections between the master wheel, reel carrier devices and packer operating mechanism are very direct, thus eliminating many parts and correspondingly reducing the expense and weight.

The cumbersome and expensive shifting mechanism for the knotter head is entirely dispensed with in the improved apparatus.

The parts which are rotative, are few, consequently the parts to be lubricated are materially reduced.

What is claimed is:—

1. In an apparatus of the class described, a supporting frame, a sickle device carried by said frame, a relatively narrow carrier belt supported in said frame rearwardly of said sickle device, and a relatively wide carrier belt supported in said frame rearwardly of the narrower carrier belt and inclined upwardly and rearwardly.

2. In an apparatus of the class described, a supporting frame, a tractor wheel mounted on said frame, a sickle device carried by said frame, a relatively narrow carrier belt supported in said frame rearwardly of said sickle device, a relatively wide carrier belt supported in said frame rearwardly of the narrow carrier belt and inclined upwardly and rearwardly, means for transmitting the motion of said tractor wheel to said narrower carrier belt, and means for transmitting the motion of the narrower carrier belt to the wider carrier belt.

3. In an apparatus of the class described, a supporting frame, a tractor wheel mounted on said frame, a grain binder packer shaft supported on said frame, a sickle device carried by said frame, a relatively narrow carrier belt supported in said frame rearwardly of said sickle device, a relatively wide carrier belt supported in said frame rearwardly of the narrower carrier belt and inclined upwardly and rearwardly, a counter shaft supported on said frame, means for transmitting the motion of said tractor wheels to said counter shaft, means for transmitting the motion of said counter shaft to said sickle device, means for transmitting the motion of said counter shaft to said packer shaft, means for transmitting the motion of said counter shaft to said narrower carrier belt, and means for transmitting the motion of the narrower carrier belt to wider carrier belt.

4. In an apparatus of the class described, a supporting frame, a tractor wheel mounted on said frame, a grain binder packer shaft supported in said frame, a reel including a supporting standard and operating shaft mounted on said frame, a sickle device carried by said frame, a relatively narrow carrier belt supported in said frame rearwardly of said sickle device, a relatively wide carrier belt supported in said frame rearwardly of the narrower carrier belt and inclined upwardly and rearwardly, a counter shaft supported on said frame, means for transmitting the motion of said tractor wheel to said counter shaft, means for transmitting the motion of said counter shaft to said sickle device, means for transmitting the motion of said counter shaft to said packer shaft, means for transmitting the motion of said counter-shaft to said reel operating shaft, means for transmitting the motion of said counter shaft to said narrower carrier belt, and means for transmitting the motion of the narrower carrier belt to wider carrier belt.

5. In an apparatus of the class described, a supporting frame, a sickle device carried by said frame, a relatively narrow carrier belt supported in said frame rearwardly of said sickle device, a relatively wide carrier belt supported in said frame rearwardly of the narrower carrier belt and inclined upwardly and rearwardly, a bundle receiving discharging chute, and a binder mechanism between the inclined carrier and the bundle receiving discharge chute.

6. In an apparatus of the class described, a supporting frame, a sickle device carried by said frame, a relatively narrow carrier belt supported in said frame rearwardly of said sickle device, a relatively wide carrier belt supported in said frame rearwardly of the narrower carrier belt and inclined upwardly and rearwardly, a standard mounted to swing upon said frame, a bracket device slidable upon said standard, a reel including a shaft supported by said bracket, means under the control of the operator for swinging said standard, and means under the control of the operator for adjusting said bracket on said standard whereby the horizontal and vertical position of said reel may be controlled.

7. In an apparatus of the class described, a supporting frame, a standard swinging upon said frame, a bracket device slidable on said standard, a reel including a shaft supported by said bracket, rock shafts supported upon said frame and upturned at their inner ends, an operating lever for each of said rock shafts, an arm device extending forwardly of said reel shaft and coupled to the upturned end of one of the rock shafts, an arm device extending downwardly from said reel shaft, and a link member coupling the downwardly directed arm device to the upturned end of the other of the rock shafts.

8. In an apparatus of the class described, a supporting frame, a tractor wheel carried by said frame, a sickle device carried by said frame, a relatively narrow horizontally operating carrier belt rearwardly of said sickle device, a relatively wide carrier belt supported on said frame rearwardly of the narrower carrier belt and inclined upwardly and rearwardly to cause the headed portions of the harvested grain to be conveyed relatively near the axial line of the tractor wheels, and a binder mechanism in position to receive the grain from the inclined carrier belt.

9. In a grain binder, a sickle device, a binder mechanism with its knotter head carrying arm inclined downwardly and forwardly, a relatively narrow horizontal carrier operating relatively close to the sickle device to receive the grain when first severed thereby, a wider upwardly and rearwardly inclined slatted carrier to receive the severed grain from the narrow carrier and convey it toward the binder mechanism, an inclined deck in position to receive the severed grain from the inclined carrier and having a depression in its rear upper face to receive the head portions of the severed grain, a stationary butter device at the lower forward end of the deck member, and a rearwardly inclined and rearwardly opening chute to receive the bound bundles from the binder mechanism, and discharge them toward the rear.

In testimony whereof, I affix my signature hereto.

CLAUDE H. McCLURE.